(12) United States Patent
Portas et al.

(10) Patent No.: US 7,728,227 B2
(45) Date of Patent: Jun. 1, 2010

(54) METHOD FOR COVERING AN ELONGATE OBJECT AND DEVICE FOR COVERING SAID ELONGATE OBJECT

(75) Inventors: Francesco Portas, Milan (IT); Ubaldo Vallauri, Monza (IT)

(73) Assignee: Prysmian Cavi E Sistemi Energia SRL, Milan (IT)

( * ) Notice: Subject to any disclaimer, the term of this patent is extended or adjusted under 35 U.S.C. 154(b) by 599 days.

(21) Appl. No.: 11/570,212

(22) PCT Filed: Jun. 25, 2004

(86) PCT No.: PCT/EP2004/006978

§ 371 (c)(1),
(2), (4) Date: May 24, 2007

(87) PCT Pub. No.: WO2006/002650

PCT Pub. Date: Jan. 12, 2006

(65) Prior Publication Data

US 2008/0121408 A1    May 29, 2008

(51) Int. Cl.
*H02G 15/02* (2006.01)
(52) U.S. Cl. .................. 174/73.1; 174/88 C; 174/84 R; 174/117 F; 174/74 A; 439/201; 439/796; 138/103
(58) Field of Classification Search .............. 174/88 C, 174/84 R, 74 R, 117 F, 74 A, 73.1; 439/201, 439/901, 796, 738; 138/103, 118, 148, 166
See application file for complete search history.

(56) References Cited

U.S. PATENT DOCUMENTS

| | | | |
|---|---|---|---|
| 4,383,131 A | | 5/1983 | Clabburn et al. |
| 5,041,027 A | * | 8/1991 | Lien ............................ 439/796 |
| 5,406,871 A | * | 4/1995 | Lambert, Jr. ................. 138/103 |
| 5,899,765 A | * | 5/1999 | Niekrasz et al. .............. 439/201 |
| 6,105,620 A | * | 8/2000 | Haberl ........................ 138/118 |
| 7,170,004 B2 | * | 1/2007 | Gramespacher et al. ..... 174/73.1 |
| 7,476,114 B1 | * | 1/2009 | Contreras .................... 439/201 |
| 7,495,172 B2 | * | 2/2009 | Amerpohl ................... 174/73.1 |
| 7,511,222 B2 | * | 3/2009 | Taylor et al. ............... 174/84 R |
| 7,514,635 B2 | * | 4/2009 | Meier et al. .................. 174/135 |
| 7,557,300 B2 | * | 7/2009 | Thompson et al. ........ 174/74 R |

FOREIGN PATENT DOCUMENTS

EP             199742             4/1986

(Continued)

*Primary Examiner*—Dhiru R Patel
(74) *Attorney, Agent, or Firm*—Norris McLaughlin & Marcus

(57) ABSTRACT

The present invention relates to a method for covering an elongate object in particular an electric cable or a pipe. The method includes providing a covering assembly which includes a tubular elastic covering element having at least one end which is folded to define at least one backward folded portion and at least one forward folded portion; a first supporting element which is arranged radially internal to the covering element and which holds the covering element in a radially stretched condition, and a second supporting element which is coaxially arranged around the first supporting element, the second supporting element holding said forward folded portion of the tubular elastic covering element in a radially stretched condition; removing the first supporting element to allow the sleeve to gradually collapse onto the elongate object.

37 Claims, 6 Drawing Sheets

FOREIGN PATENT DOCUMENTS

| | | |
|---|---|---|
| EP | 379056 | 7/1990 |
| EP | 393495 | 10/1990 |
| EP | 415082 | 3/1991 |
| EP | 422567 | 4/1991 |
| EP | 541000 | 5/1993 |
| EP | 547656 | 6/1993 |
| EP | 547667 | 6/1993 |
| EP | 735639 | 10/1996 |
| EP | 767523 | 4/1997 |
| EP | 974179 | 10/1998 |
| EP | 966780 | 12/1999 |
| FR | 2756674 | 6/1998 |

* cited by examiner

METHOD FOR COVERING AN ELONGATE OBJECT AND DEVICE FOR COVERING SAID ELONGATE OBJECT

FIELD OF THE INVENTION

The present invention relates to a method for covering an elongate object, such as a pipe, a cable or a cable accessory, e.g. a termination of an electric cable.

In particular, the present invention relates to a method for applying a covering layer to an elongate element, said covering element being in the form of an elastic tubular sleeve.

More in particular, the present invention relates to a method for applying a covering element in correspondence of the splicing zone between two elongate objects.

Even more in particular, the present invention relates to a method for providing a joint between two electric cables, said method comprising the step of providing the splicing zone with a tubular elastic outer sheath having the function of protecting said splicing zone.

Furthermore, the present invention relates to a covering assembly in the form of a pre-expanded elastic tubular sleeve which is provided to an elongate object, for instance for conferring thereto insulating, conductive or sealing properties.

Moreover, the present invention relates to a joint assembly which is suitable for being applied in the splicing zone between two electric cables.

PRIOR ART

It is generally known that a covering element can be applied to a cable or a pipe in the form of a shrinkable tubular sleeve by radially pre-expanding said sleeve and successively causing it to collapse onto the cable or the pipe by means of heat (heat-shrinkable sleeve) or by removal of a supporting element which holds the elastic sleeve in a radially stretched condition (cold-shrinkable sleeve).

As mentioned above, a protective outer sheath—in the form of a tubular elastic sleeve—is generally provided, for instance, in the splicing zone between two electric cables so as to restore the polymeric outer sheath of said cables.

Generally electric cables for conveying or supplying energy, in particular for conveying or supplying medium-voltage or high-voltage energy, comprise, from the inside towards the outside of the cable: a metallic conductor, an inner semiconductive layer, an insulating layer, an outer semiconductive layer, a metallic screen—usually made of aluminum, lead or copper—and an external protective polymeric sheath. The assembly: metallic conductor, inner semiconductive layer, insulating layer and outer semiconductive layer is generally known by the term "cable core".

In the present description, the term medium voltage is used to refer to a tension typically from about 1 kV kilovolts to about 30 kV kilovolts and the term high voltage refers to a tension above 30 RV kilovolts. The term very high voltage is also used in the art to define voltages greater than about 150 kV kilovolts or 220 kV kilovolts, up to 500 kV kilovolts or more.

In order to form a joint between two sections of two electric cables, for example of the single-pole type (unipolar cable), the ends of both said sections are processed beforehand so as to expose, over a portion of defined length, the aforementioned elements (or most of them) which form the above mentioned cables.

Subsequently, the splicing operation comprises the step of forming an electric connection between the conductor elements, for example by means of soldering or scarfing of the latter, and the step of positioning, in the zone where said conductor elements are spliced together, a joint assembly having a form which is substantially cylindrical in its central portion and frustoconical at the ends thereof.

A joint assembly generally comprises a plurality of radially superimposed elements intended to restore the electric and mechanical properties between the exposed layers of a first cable section and the corresponding exposed layers of a second cable section.

Therefore, starting from its innermost portion, a joint assembly—typically for a MV electric cable—generally comprises an elastic tubular sleeve comprising the following joint components: an electric field control layer made of a material with a high dielectric constant which—when installed—is placed in correspondence of the insulating layers of the cables; a layer of insulating material of considerable thickness which surrounds said electric field control layer; and a layer of semiconductive material located radially outside to said insulating layer and connected to the outer semiconductive layer of each cable section designed to restore the continuity of the outer semiconductive layers of said first and second section. During installation, the zone where the two conductor elements are spliced together is generally filled with an electric-field control material.

Methods for manufacturing joints are known in the art and are described, for example, in documents EP-379,056; EP-393,495; EP-415,082; EP-199,742; EP-422,567 in the name of the same Applicant.

Generally, a joint assembly is produced separately and includes an elastic tubular sleeve which is fitted, in an elastically stretched condition, on a hollow tubular supporting element made of rigid plastic. The joint assembly is engaged around one of the cable sections before the formation of the electric connection between the metallic conductors is performed.

This supporting element may be obtained by using different methods which allow the removal thereof once the electric connection has been formed. For example, this tubular support may be formed by a strip-like element helically wound so as to form a plurality of adjacent coils fastened together so that, when a pulling force is exerted on a free end portion of said strip-like element, the tubular support is able to collapse, due to the gradual removal of the coils, and allow the correct positioning of the elastic tubular sleeve (i.e. of the joint components mentioned above). In so doing, the sleeve elastically contracts, gripping the cable sections in the splicing zone. This joint assembly is of the cold-shrinkable type. Embodiments of said supports are described, for example, in the documents EP-541,000; EP-735,639; EP-547,656; EP-547,667 in the name of the same Applicant.

In alternative, the supporting element can be made of a solid tube which can be removed by axially extracting it from the tubular elastic sleeve supported thereon.

Alternatively, joint assemblies may be made by using heat-shrinkable materials, thus producing the so-called heat-shrinkable sleeves described, for example, in the U.S. Pat. No. 4,383,131.

A joint assembly (especially for medium voltage electric cables) also preferably comprises a tubular metallic braid which is intended to restore the metallic screens of the spliced cables. Preferably, the metallic braid is made of tin-coated copper wires or strips, and is applied by electrically connecting the exposed metallic screen portion of the first cable section and the exposed metallic screen of the second cable section.

In the case where the electric connection is performed between two sections of electric cables of the multi-pole type—for example double-pole or triple-pole type—the procedure described hitherto can be repeated for each single phase of each cable.

Finally, a joint assembly normally further comprises a tubular elastic protective outer sheath suitable for restoring the external mechanical protection of the spliced cables, said outer sheath being fitted in a position radially external to the elastic tubular sleeve comprising the joint components mentioned above. Preferably, once installed on the splicing zone, this outer sheath is intended to protect the underlying elements of the joint from coming into contact with moisture and/or water from the outside.

It can be noted that the method of applying a covering element to an elongate element, such as a cable or a pipe, is generally carried out in trenches dug in the ground or in narrow areas which are possibly contaminated with dust, moisture and/or debris.

This is particularly true in case a joint is provided between two electric cables. In fact, since a joint is arranged and made operative in trenches dug in the ground, during installation the technical personnel has to operate in areas of very narrow dimensions and often in the presence of dust, moisture and/or debris accumulated along the edges thereof.

Furthermore, during installation, the covering element, which is provided in a radially stretched condition (i.e. radially pre-expanded) and is introduced over an end of one elongate element before the connection thereof to a further elongate element, is "parked" on an elongate element end and successively moved over the connecting (splicing) zone and collapsed thereon.

Therefore, due to the very narrow space which is available to carry out the installation, it is advantageous to reduce the covering element size—especially the axial dimensions thereof—so that the "parking" space, which is required on the elongate element end before the connecting operation is carried out, can be advantageously reduced.

Document EP-966,780 discloses a covering device for covering an elongate object, comprising a folded elastic element and a first hollow support. The folded elastic element has an inner portion and at least one coaxially disposed outer tubular portion overlaying said inner portion, said inner portion and said outer tubular portion being continuously joined at a circumferential edge. The first hollow support, which is coaxially disposed around said inner portion, holds the outer tubular portion in a radially stretched condition and is adapted to be removed progressively from the outer tubular portion starting at the end thereof closest to said circumferential edge. According to a further embodiment, the covering device is provided with two different supports: a first removable support which holds the outer elastic tubular portion in a radially expanded condition, and a second removable support which holds the inner elastic tubular portion in a radially expanded condition, wherein the outer tubular portion is folded back over the inner tubular portion to form a circumferential fold.

The Applicant has observed that the technical solution disclosed by document EP-966,780 presents a plurality of drawbacks.

First of all, it can be noted that, according to most of the embodiments described in said document (see, for instance, FIGS. 1, 3, 4, 5, 6B, 7 and 8, and the relevant description thereof), since the folded portions have a U-shape configuration, the radially external surface of the outer elastic tubular portion of the covering element in the pre-stretched condition is caused to come into contact with the elongate element when the covering element collapses thereonto.

This aspect is particularly disadvantageous since the radially external surface of the outer elastic tubular portion of the covering element in the pre-stretched condition, i.e. when the covering element is parked on an elongate element end, comes into contact with dust, moisture and/or debris present in the trench, said impurities being thus transferred and trapped inside of the covering element when the latter is collapsed onto the elongate element during installation.

Said possible impurities contaminate the covering element and negatively affect the mechanical properties of the elongate elements connection. In particular, the presence of said impurities decreases the sealing property of the covering element and some water can penetrate into the cable which possibly causes corrosion as well as problems of accelerated ageing of the cable with deterioration of the electric features thereof.

Secondly, according to the method described in document EP-966,780, in order to assist the correct unfolding of the elastic covering element, the covering device has to be pushed (see arrow A of FIG. 7B) while the support is being removed.

The Applicant has observed that this aspect contributes to increase the complexity of said method since during installation, which is manually carried out by technical personnel operating in the narrow areas mentioned above, the personnel has to remove the support—e.g. by pulling with one hand on the helically wound strip which forms the support—and to push the covering device with the other hand, preferably simultaneously.

As a consequence, the installation of such a covering device is complex and difficult to be performed.

Furthermore, the technical solutions described in document EP-966,780, in particular the covering device of FIG. 8 in which two different supports are provided so that an outer tubular portion of the folded elastic element is folded back over an inner tubular portion of the elastic element to form a circumferential fold, are difficult to be industrially obtained.

For instance, the outer tubular portion, i.e. the folded back portion of the elastic element, can be folded back when the inner tubular portion is already in a radially pre-expanded condition. This means that the formation of the outer tubular portion is obtained by folding back the axially outer end of the inner tubular portion and by simultaneously inserting the second support between the inner tubular portion and the outer tubular portion which is being formed.

This operation is particularly difficult since the formation of the folded back portion is carried out at the maximum radial expansion thereof, with relatively high elastic forces to be overcome.

SUMMARY OF THE INVENTION

The Applicant has perceived the need of providing a method for covering an elongate object which can be simply carried out by the technical personnel, even when operating in narrow areas such as in trenches (or manholes) dug in the soil, and which can ensure a satisfactory result in terms of providing an outer protective covering element in the splicing zone between two elongate elements.

Furthermore, the Applicant has perceived the need of providing a covering assembly which is easy to be manufactured and installed, and which also presents very limited dimensions, principally in the axial direction, so that the parking area—which is required during installation—can be advantageously reduced and the operations of the technical personnel inside of the trench can be advantageously improved.

Moreover, in the case a joint between to electric cables has to be performed, the Applicant has perceived the need of providing a covering assembly whose size and constructive features allow the technical personnel to easily operate on the metallic screens of the two cables to restore the electrical continuity thereof.

The Applicant has found that a covering assembly having small length and ease of installation can be obtained by providing the splicing zone of two elongate elements with a covering element which comprises—at each axial end thereof—at least two folded portions which are coaxially arranged and radially superimposed, said folded portions being supported in a pre-stretched condition on two different supporting elements during installation.

In particular, the Applicant has found a method for covering an elongate object, said method comprising the steps of:
  providing a covering assembly which comprises:
    a tubular elastic covering element having at least one end which is folded to obtain at least one backward folded portion and at least one forward folded portion;
    a first supporting element which is arranged radially internal to said covering element and which holds said covering element in a radially stretched condition, and
    a second supporting element which is coaxially arranged around said first supporting element, said second supporting element holding said at least one forward folded portion in a radially stretched condition;
  placing said covering assembly substantially coaxially with the elongate object and radially external thereto;
  removing said first supporting element to allow the covering element to collapse onto the elongate object, and
  removing said second supporting element to allow the at least one backward folded portion and the at least one forward folded portion to collapse onto the elongate object.

According to the present description, the term "backward folded portion" is intended to indicate a portion of the axial end of the covering element which is folded towards the central portion of the covering element.

According to the present description, the term "forward folded portion" is intended to indicate a portion of the axial end of the covering element which is folded towards said axial end of the covering element.

The Applicant has observed that the covering method of the present invention is particularly advantageous, for example with respect to the method disclosed in document EP-966,780, also for the reason that the presence of two folded portions at each axial end of the covering element allows to sensibly reduce the parking area of the covering assembly.

In fact, as mentioned above, the folded portion according to document EP-966,780 (with particular reference to FIG. 8 of said document) has a U-shape configuration whose axial dimensions are greater than the axial dimensions of the two folded portions of the covering element of the present invention, said two folded portions having a Z- or S-shape configuration, so that the axial length of the two folded portions is substantially one half the axial length of the single U folded portion of document EP-966,780.

The covering method of the present invention is particularly advantageous not only in the case the covering assembly is used to provide a protective covering element to the splicing zone of two or more electric cables, said covering element being the polymeric outer sheath of the joint being formed.

In fact, due to the very small axial dimensions of the covering assembly according to the present invention, the latter can be used in any case an elongate element is requested to be provided with an external covering element.

For example, said covering element can be applied in correspondence of the splicing zone between two pipes, or in a position radially external to the joint already formed and completed between two cables. For instance, in the case the electric cables are of the multi-polar type, each phase of the cables are spliced by means of a joint assembly and a further covering element according to the present invention is applied in a radially outer portion of the splicing zone.

According to the method of the present invention, the two folded portions, i.e. the at least one backward folded portion and the at least one forward folded portion, are unfolded over the elongate object by axially translating the at least one forward folded portion while being hold on the second supporting element.

The axial translation of the at least one forward folded portion is carried out in a direction substantially parallel to the longitudinal axis of the tubular elastic covering element.

Moreover, the axial translation of the at least one forward folded portion is carried out towards the axial end thereof.

According to the method of the present invention, the step of unfolding is carried out before the step of removing the second supporting element.

Preferably, the step of removing the first supporting element is carried out to allow the tubular elastic covering element to gradually collapse onto the elongate object.

Preferably, the step of removing the second supporting element is carried out to allow the at least one backward folded portion and the at least one forward folded portion to gradually collapse onto the elongate object.

The method of the present invention can further comprise the step of splicing two elongate objects so that the step of placing the covering assembly comprises the step of positioning the latter in correspondence of the splicing zone of said two elongate objects.

Before the step of placing is carried out, the method of the present invention comprises the step of engaging the covering assembly around one end of one elongate object and successively parking the covering assembly on it.

Furthermore, the present invention relates to a covering assembly for covering an elongate object, said assembly comprising:
  a tubular elastic covering element having at least one end which is folded to define at least one backward folded portion and at least one forward folded portion;
  a first supporting element which is arranged radially internal to said covering element and which holds said covering element in a radially stretched condition, and
  a second supporting element which is coaxially arranged around said first supporting element, said second supporting element holding the at least one forward folded portion in a radially stretched condition.

Preferably, the at least one backward folded portion and the at least one forward folded portion are coaxially arranged and radially superimposed.

Preferably, the at least one backward folded portion and the at least one forward folded portion are radially spaced apart from each other.

Preferably, the at least one backward folded portion and the at least one forward folded portion are consecutive.

Preferably, the at least one backward folded portion and the at least one forward folded portion are continuously joined by means of at least a first curvilinear portion and a second curvilinear portion of said tubular elastic covering element.

The tubular elastic covering element of the covering assembly according to the present invention is required to radially expand to a large diameter—especially in correspondence of the forward folded portion thereof—and successively to shrink back so as to collapse onto the elongate element and to restore its original dimensions when the expanding force is removed, i.e. when the supporting elements—on which the tubular elastic covering element is supported—are removed.

In order to carry out the expansion and shrinkage operations mentioned above, the tubular elastic covering element is required to have an inner diameter at rest, i.e. in the absence of applied stresses, which is lower than the outer diameter of the elongate element, the difference between said diameters giving rise to an elastic deformation of the elastic covering element which corresponds to the desired clamping force of the elastic covering element on the elongate element.

This means that the tubular elastic covering element has a predetermined interference with the diameter of the elongate element so as to remain around it in elastically stretched conditions.

The required degree of interference for developing a predetermined pressure depends on the deformability of the material of which the tubular elastic covering element is made—that is on its stiffness—and on the radial thickness of the elastic covering element.

Generally, in the rubber technology the material stiffness is measured in terms of stress which is required to obtain a given elongation.

According to ASTM Standard D412-92 (Standard test Methods for Vulcanized Rubber—Tension), the 300% tensile stress (also called the 300% modulus) (measured in MPa) represents the stress which is required to stretch the uniform cross-section of a test specimen for a 300% elongation.

The 300% modulus for the materials commonly suitable for use in this application is in the range from about 1 to about 10 MPa, preferably from about 2 to about 6 MPa.

Taking into account the materials commonly used and the sizes suitable for the intended applications, a sufficient clamping of the tubular elastic covering element on the elongate element can be achieved by an interference value between the elastic covering element and the outer diameter of the elongate element greater than or equal to 20%, when the 300% modulus is at least 1 MPa and the thickness of the tubular elastic covering element is at least 5 mm.

In case the elongate element is an electric cable and a joint assembly is provided to electrically connect two electric cables, according to an embodiment of the present invention, the tubular elastic covering element of the covering assembly is the tubular elastic protective outer sheath which is placed in correspondence of the splicing zone and partially overlaps the polymeric outer sheaths of the electric cables so as to restore the external sheaths thereof in the splicing zone.

In such a case, the elastic tubular sleeve of the joint assembly (said elastic tubular sleeve comprising, as mentioned above, an electric field control layer made of a material with a high dielectric constant, a layer of insulating material and a layer of semiconductive material) is provided supported—in a radially stretched condition—on a first supporting element which holds also the central portion of the protective outer sheath, while the forward folded portion thereof is hold on a second supporting element which is coaxial and radially external to said first supporting element.

Preferably, the interference between the tubular elastic covering element and the first supporting element is comprised between 150% and 300%.

Preferably, the interference between the forward folded portion of the tubular elastic covering element and the second supporting element is comprised between 200% and 400%.

Preferably, the tubular elastic covering element, e.g. the cable protective outer sheath, is made of an elastomeric material chosen in the group consisting of: natural rubber, polyisoprene, cis-polybutadiene rubber, styrene butadiene rubber, butadiene-acrylonitrile rubber, polychloroprene, butyl rubber, polysulphide rubber, silicone rubber, urethane rubber, polyacrylate rubber, propylene oxide rubber, fluorosilicone rubber, fluorocarbon rubber, chloro-sulphonated polyethylene rubber, chlorinated polyethylene rubber, ethylene-propylene rubber, ethylene-propylene-diene monomer.

Preferably, the elastomeric material of the tubular elastic covering element is cross-linked.

Preferably, the tubular elastic covering element is made of a material which has a low permanent set. Preferably, the permanent set is lower than 70%. More preferably, the permanent set is comprised between 20% and 50%.

In percentage, the permanent set is defined as follows:

$$\text{permanent·set} = \frac{\text{final·diameter} - \text{initial·diameter}}{\text{initial·diameter}} \times 100$$

wherein:
the initial diameter is the inner diameter of a tube made of the elastic material at its initial relaxed (i.e. not stretched) condition, and
the final diameter is the restored inner diameter of said tube after having been maintained at a given stretched condition for a sufficiently long period of time.

The permanent set of an elastic material is generally measured by expanding a tube made of said elastic material—which has a known initial relaxed inner diameter—to the required expansion degree and by holding it in the expanded condition, e.g. by supporting it on a suitable supporting element.

The tube in the expanded condition is stored for a long period of time, e.g. 6 months, at a desired temperature until the material has reached a relatively stable state and no substantial changes occur.

Successively, the tube is removed from the support and allowed to relax and the final relaxed inner diameter is measured.

Preferably, the thickness of the tubular elastic covering element in the rest (unstretched) condition is comprised between 2 mm and 10 mm.

Preferably, the inner diameter of the tubular elastic covering element in the rest (unstretched) condition is comprised between 10 mm and 80 mm.

Moreover, the present invention relates to a joint assembly for electric cables comprising:
a first supporting element;
a tubular elastic sleeve which comprises at least an electric insulating layer, said tubular elastic sleeve being supported on said first supporting element in a radially stretched condition;
a tubular elastic outer sheath having at least one end which is folded to define at least one backward folded portion and at least one forward folded portion, said tubular elastic outer sheath being placed radially external to said tubular elastic sleeve, and
a second supporting element which is coaxially arranged around said first supporting element, said second supporting element holding said at least one forward folded portion in a radially stretched condition.

Furthermore, the joint assembly according to the present invention further comprises a tubular metallic braid which is positioned around the tubular elastic sleeve.

Moreover, the joint assembly according to the present invention further comprises a semiconductive layer around said electric insulating layer.

BRIEF DESCRIPTION OF THE FIGURES

The description, provided hereinbelow, relates to the accompanying drawings provided solely by way of explanation and not intended to be limiting in any way, where.

DETAILED DESCRIPTION OF THE PREFERRED EMBODIMENTS

The description which follows and the figures associated therewith illustrate the case where the method for covering an elongate object and the covering assembly of the present invention relate to an electric connection between two electric cables for conveying or supplying electric energy.

However, it has to be noted that the present invention may be generally applied to any electric or optical connection forming part of an electric and/or telecommunication network as well as to any electric connection between a cable and an electric apparatus, e.g. a termination.

Therefore, even though the present description and the drawings referred thereto relate to a covering assembly for electric cables and electric joining accessories, such as cable joints and terminations, the present invention is not limited thereto and may be used for covering any elongate element, e.g. for sealing a splicing zone between two pipes.

As will emerge more clearly from the present description, which focuses on the splicing zone between two electric cables, the structural aspects of a joint will not be described in details since they are conventional and well known in the art.

Figure 1:
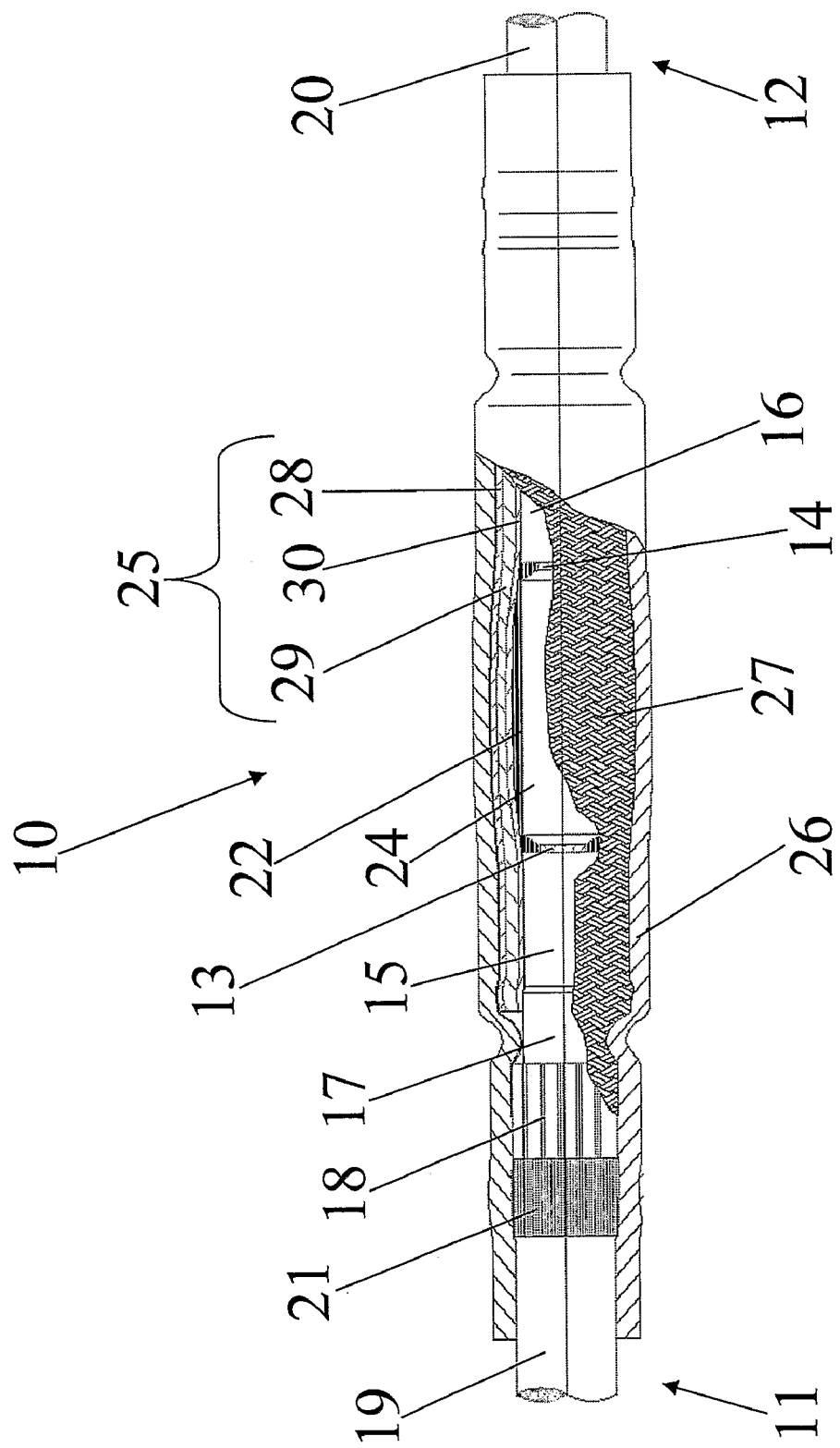
FIG. 1 shows a partially axially-sectioned, schematic side view of a joint installed between two single-pole electric cables.

In FIG. 1, reference 10 denotes generically the electric connecting zone between two electric cables 11, 12 of the unipolar type.

As mentioned above, the electric connection between cables 11, 12 is obtained by arranging, coaxially facing each other, the ends of said cables 11, 12 scalarly stripped of the coating layers associated to the respective conductors 13, 14 which are exposed over a predefined length.

The coating layers of cables 11, 12 are scalarly removed by exposing, for each cable and over a given length, in succession: the insulating layers 15 and 16, the outer semiconductive layer 17 (only the outer semiconductive layer of cable 12 being shown in FIG. 1), the metallic screen 18 (only the metallic screen of cable 12 being shown in FIG. 1), and the polymeric outer sheaths 19 and 20.

In FIG. 1, the metallic screen 18 is made of metal wires. According to such embodiment, the metal wires are cut and folded back for a predetermined length onto the end of the polymeric outer sheath 19. Preferably, the metal wires of the metallic screen 18 are fastened by means of a PVC tape 21.

Alternatively, the metallic screen 18 is made of a metallic tape (not shown in the figures) which is folded back in a similar manner as described above.

As shown in FIG. 1, the exposed end portions of each conductor 13, 14 are electrically connected together by means of an element 24 which is known per se and consists, for example, of a soldering zone or of a crimping connector. Alternatively, the conductors 13, 14 are mechanically fastened by means of screws or a bayonet-type connection.

Preferably, once the electric connection between the above mentioned conductors 13, 14 has been performed, the space corresponding to the removed sections of the insulating layers 15, 16 is generally filled with a deformable, field-control, filling material 22.

The electric connection 10 between the two cables 11, 12 is thus covered by a joint assembly 50 (shown in FIG. 3) which is slidably fitted onto one end of the cables—before they are connected together—and successively positioned above said electric connection once the element 24 and the filling material have been applied.

Preferably, the joint assembly 50 comprises a tubular elastic sleeve 25 which has the function of restoring the continuity of the outer semiconductive layer, the insulating layer, the metallic screen and the polymeric outer sheath of the cables 11, 12. Therefore, as mentioned above, the tubular elastic sleeve 25 generally comprises a plurality of layers which are coaxially disposed and radially superimposed to be provided on the electric connection 10.

Figure 3:
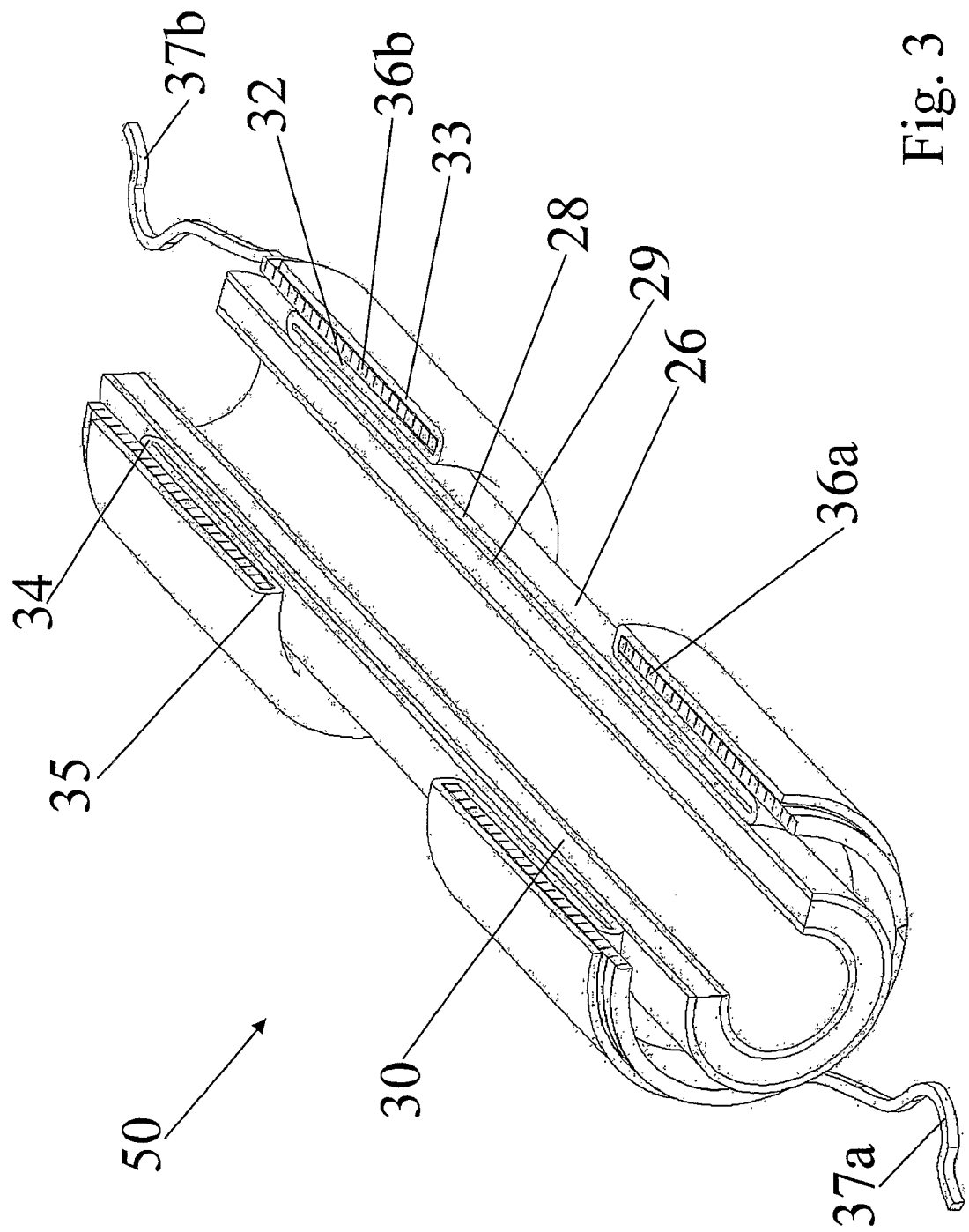
FIG. 3 shows a partially sectioned perspective view of a joint assembly suitable for being applied in the connecting zone between two electric cables as shown in FIG. 1.

In details, the tubular elastic sleeve 25 (as shown in FIG. 3) generally comprises, from the radially outer layer to the radially inner layer: a semiconductive layer 28, an insulating layer 29 and an electric field control layer 30. The electric field control layer 30 is a high relative dielectric constant layer. Preferably, the material of said layer 30 has a relative dielectric constant $\in$ in the range from 6 to 20.

Preferably, the joint assembly 50 further comprises a tubular metallic braid 27 (not shown in FIG. 3) which is positioned around the tubular elastic sleeve 25.

Furthermore, as shown in FIG. 3, the joint assembly 50 further comprises a tubular elastic protective outer sheath 26 which is radially external to the tubular elastic sleeve 25 (or to the tubular metallic braid 27, if present).

The joint assembly 50 is advantageously pre-assembled in a manufacturing plant and the tubular elastic sleeve 25 (as well as the tubular elastic outer sheath 26) is supported, in a radially stretched condition, on a removable supporting element 31 (see FIG. 2, for example), as disclosed, for instance, in the above mentioned documents EP-541,000; EP-735,639; EP-547,656; EP-547,667 in the name of the same Applicant.

Preferably, the removable supporting element 31 is a rigid tubular element.

Preferably, the removable supporting element 31 is cylindrical in shape.

Preferably, the surface of the removable supporting element 31 is provided with a helical incision to define a plurality of adjacent coils as disclosed, for instance, in documents EP-541,000; EP-735,639; EP-547,656; EP-547,667 in the name of the same Applicant.

Alternatively, the removable supporting element 31 comprises a frusto-conical portion.

Preferably, the removable supporting element 31 comprises a cylindrical portion and a frusto-conical portion.

The frusto-conical portion of the supporting element, which is provided with a slightly tapered shape in correspondence of the end in the axially inner portion of the joint assembly. This aspect is particularly advantageous since the taper allows the supporting element to be effectively expelled by the thrust exerted by the collapsing retractable sleeve.

This means that, in the case a frusto-conical supporting element is used, once the removal thereof is started, e.g. by pulling on a free end of the supporting element, the latter is advantageously caused to be self-expelled.

Such a self-expelling operation is even more positively influenced by the presence of a lubricating material which can be applied between the supporting element 31 and the tubular elastic sleeve 25.

Preferably, this lubricating material is a grease which does not flow under the action of the pressure exerted by the shrinkable joint assembly when it is caused to collapse onto the connecting zone.

Preferably, the grease is based on a silicone or on a polyalkylene glycol advantageously additioned with a filler comprising for example talc in proportions from 15 to 35% by weight and containing preferably at least one pressure-withstanding additive such as boron nitride in proportions from 2 to 10% by weight as disclosed in document EP-974,179 in the name of the same Applicant.

Figure 2:
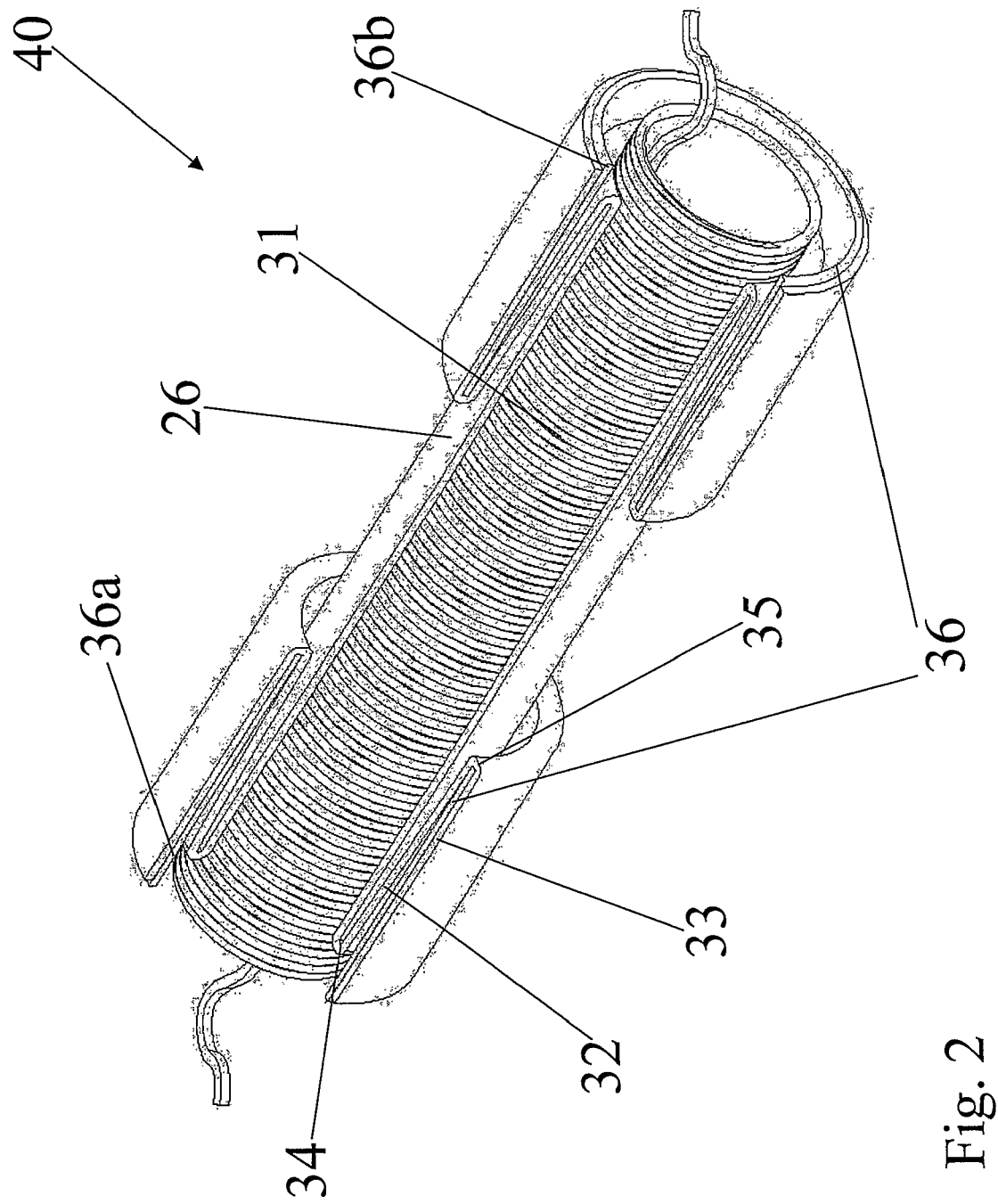
FIG. 2 shows a partially sectioned perspective view of the covering assembly of the present invention.

FIG. 2 shows the covering assembly 40 according to the present invention.

In details, FIG. 2 shows the covering element 26 (which, in the case a joint assembly for electric cables is considered, represents the tubular elastic outer sheath of the joint assembly 50) which, at each axial end thereof, comprises two folded portions which are coaxially arranged and radially superimposed to define a first radially inner folded portion 32 (i.e. a backward folded portion) and a second radially outer folded portion 33 (i.e. a forward folded portion).

The two folded portions 32, 33 extend in a longitudinal direction and are consecutive. In fact, said two folded portions are continuously joined by a first curvilinear portion 34 and a second curvilinear portion 35.

According to the present invention, the protective outer sheath 26 is supported in a pre-stretched condition on two different supporting elements.

In details, the central portion of the protective outer sheath 26, i.e. the portion of the protective outer sheath which is not folded and is far from the axial ends thereof, is supported on the first removable supporting element 31, while the forward folded portion 33—at each axial end of the protective outer sheath 26—is supported, in a radially expanded condition, on a second removable supporting element 36 which is coaxial with the first supporting element 31 and in a position radially external thereto.

Figure 4:
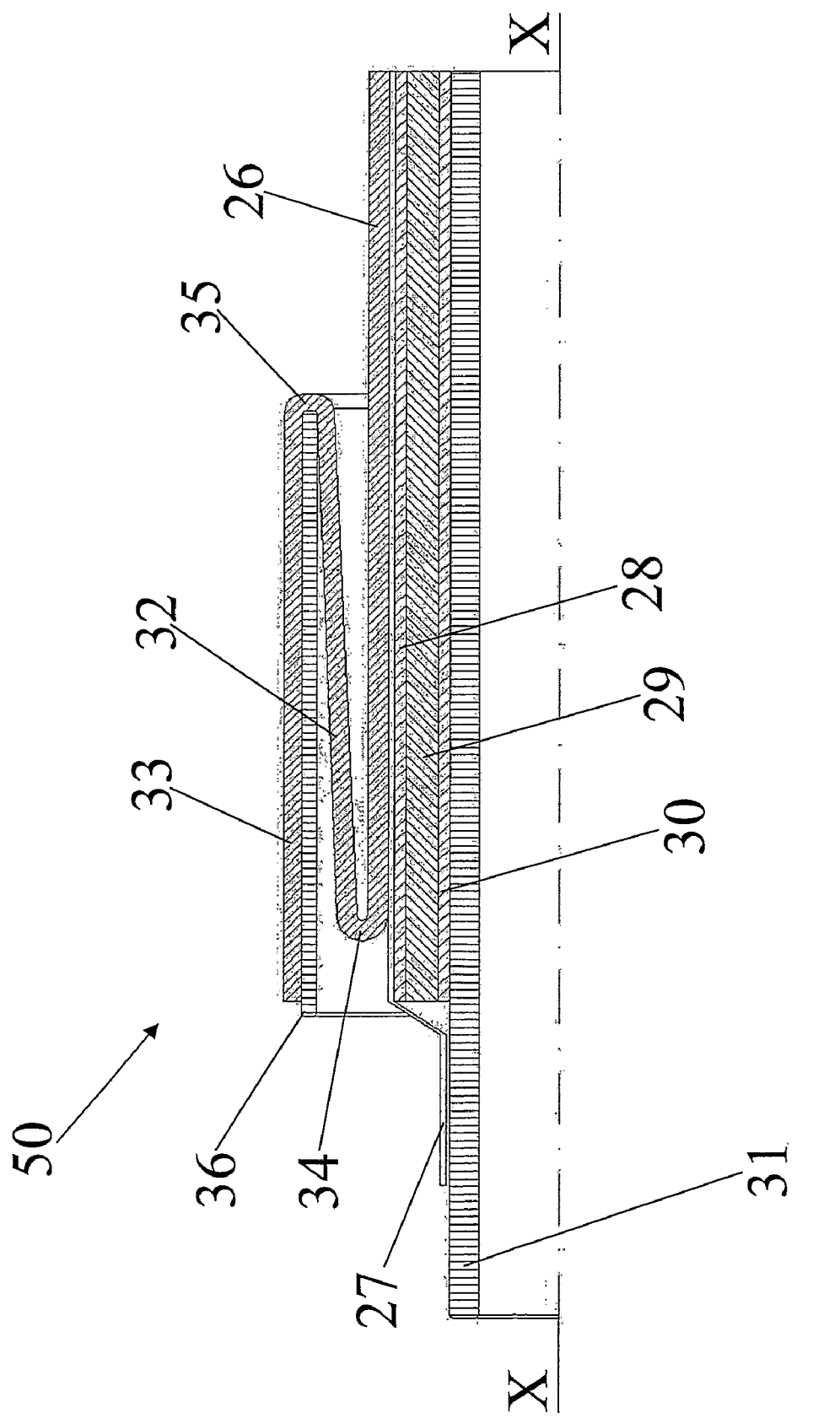
FIG. 4 shows a partially-sectioned side view of an axial end of the joint assembly of FIG. 3.

FIGS. 3 and 4 show the joint assembly 50 which is used to make the joint represented in FIG. 1.

In details, the two folded portions 32, 33 extend in a longitudinal direction which is substantially parallel to the longitudinal axis X-X of the covering assembly 40 (as well as of the joint assembly 50), the latter comprising two supporting elements 31, 36.

According to the embodiment described in FIGS. 3 and 4, the central portion of the protective outer sheath 26 is supported on the first removable supporting element 31 which holds in the expanded condition also the metallic braid 27 and the constitutive elements of the tubular elastic sleeve 25, i.e. the semiconductive layer 28, the insulating layer 29 and the high relative dielectric constant layer 30.

On the contrary, the forward folded portion 33—at each axial end of the protective outer sheath 26—is supported, in a radially expanded condition, on the second removable supporting element 36.

Therefore, according to said embodiment of the present invention, before being installed in the connecting zone, the tubular elastic sleeve 25, the metallic braid 27 and the central portion of the protective outer sheath 26 are supported in an expanded condition on the first supporting element 31 while the forward folded portions 33—at each axial end of the protective outer sheath 26—are supported on the two second supporting elements 36a, 36b.

Preferably, the first supporting element 31 consists of two distinct, axially abutted half-supports (not shown) so that their internal ends face each other.

Each half-support is provided with free end portions (not shown) for gradually removing the first supporting element 31 and allowing the tubular elastic sleeve 25 to collapse onto the electric connection (splicing zone) 10.

Preferably, said free end portions start from the axially inner ends of each half-support so that the first coils which are unwound are the axially inner ones and the tubular elastic sleeve starts collapsing from the center of the joint assembly.

The axial dimensions of the two half-supports may be the same or different. The half-supports may be cylindrical, with a circular or elliptical cross-section. They may be tapered, at least partly, with a circular or elliptical cross-section, the taper being oriented in such a way that the diameter of the half-support is smaller towards the interior of the joint assembly.

For sake of clarity, FIG. 3 does not show the first supporting element 31, while two second supporting elements 36a, 36b are shown with respective free end portions 37a, 37b for removing the supporting elements when the tubular elastic sleeve 25 is positioned on the electric connection 10.

The free end portions 37a, 37b start from the axially inner ends of each second supporting elements 36a, 36b so that the first coils which are unwound are the axially inner ones and the forward folded portions 33 start collapsing from the center of the joint assembly.

Preferably, the expansion degree of the forward folded portion 33 is at least 10% greater than the expansion degree of the central portion of the protective outer sheath 26.

More preferably, the expansion degree of the forward folded portion 33 is generally comprised between 15% and 60% of the expansion degree of the central portion of the protective outer sheath 26.

Figure 5:
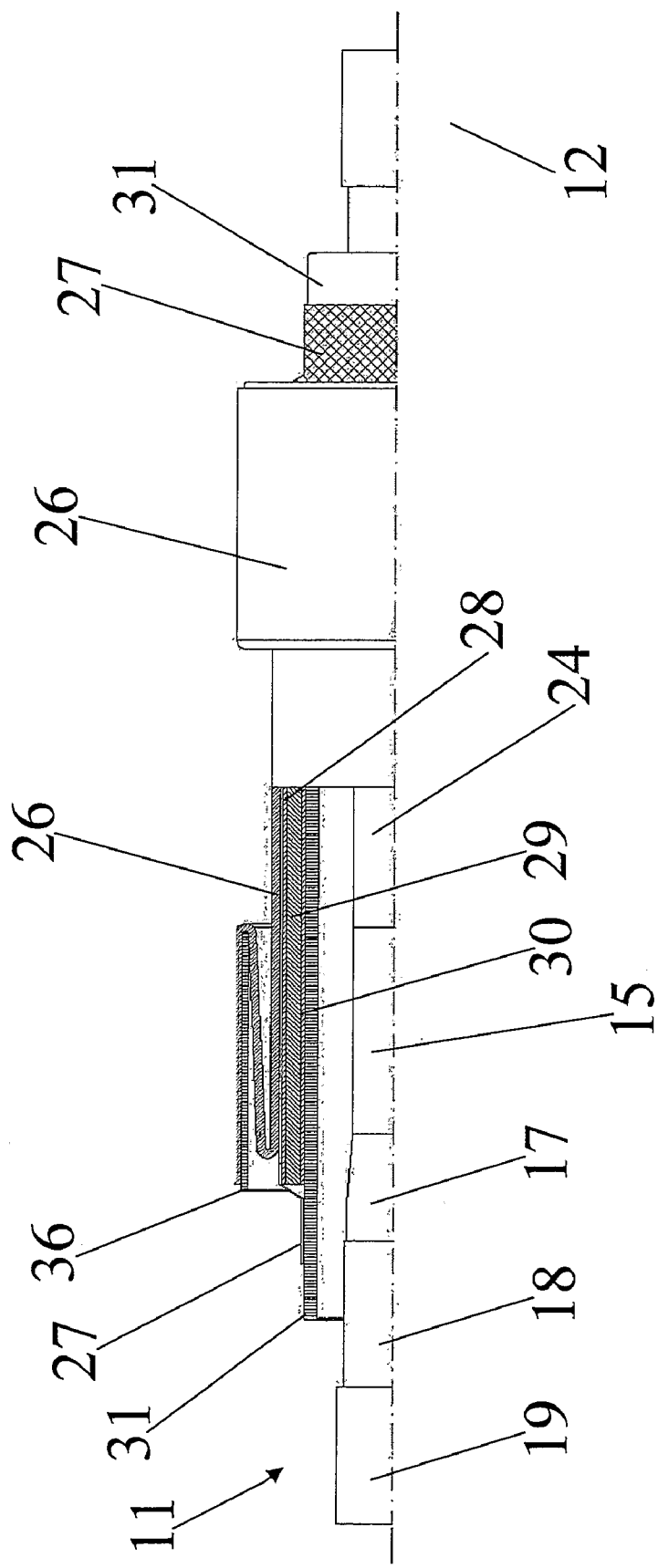
FIG. 5 shows a partially-sectioned side view of the joint assembly of FIG. 3 in correspondence of the splicing zone between two electric cables.

FIG. 5 shows a partially-sectioned side view of the joint assembly 50 which is positioned in correspondence of the connecting zone between the two electric cables 11, 12.

In details, FIG. 5 shows the first step of an embodiment of the covering method of the present invention according to which, when the electric connection between the conductors 13, 14 has been performed, the joint assembly 50 is removed from the parking area and positioned over the electric connection 10 so that the central portion of the tubular elastic sleeve 25 is symmetrically located with respect to the connecting zone.

According to said embodiment, once the tubular elastic sleeve 25 is correctly positioned, a first half-support of the first supporting element 31 is progressively removed by pulling the free end portion thereof so that the metallic braid 27, the semiconductive layer 28, the insulating layer 29 and the high relative dielectric constant layer 30 are allowed to collapse.

Advantageously, said collapsing step is caused to occur by starting from the central portion of the tubular elastic sleeve 25. This is obtained by removing said first half-support of the first supporting element 31 by starting from the axially inner end thereof.

The removal of said first half-support of the first supporting element 31 causes the high relative dielectric constant layer 30 to contact the outer semiconductive layer 17 of the cable and the metallic braid 27 to contact the cable metallic screen 18 respectively.

The same sequence of operations is carried out for removing the second half-support which constitutes the first supporting element 31 so as to restore the semiconductive layer 17 and the metallic screen 18 at the further axial end of the electric connection 10.

Preferably, the covering method of the present invention comprises the step of removing the tape 21, which fastens the metal wires of the metallic screen 18, and the step of ensuring the electric conductivity and continuity between the metallic braid 27 and the metallic screens 18 of the cables.

Preferably, the electric continuity between the cable metallic screens 18 and the metallic braid 27 is obtained by overlapping the metallic braid onto the metallic screen and by applying a fastener (not shown in the figures) onto the overlapping area. Preferably, said fastener is a metallic clamp. More preferably, said fastener is a metallic spring.

Successively, the covering method of the present invention comprises the step of collapsing the protective outer sheath 26.

Figure 6:
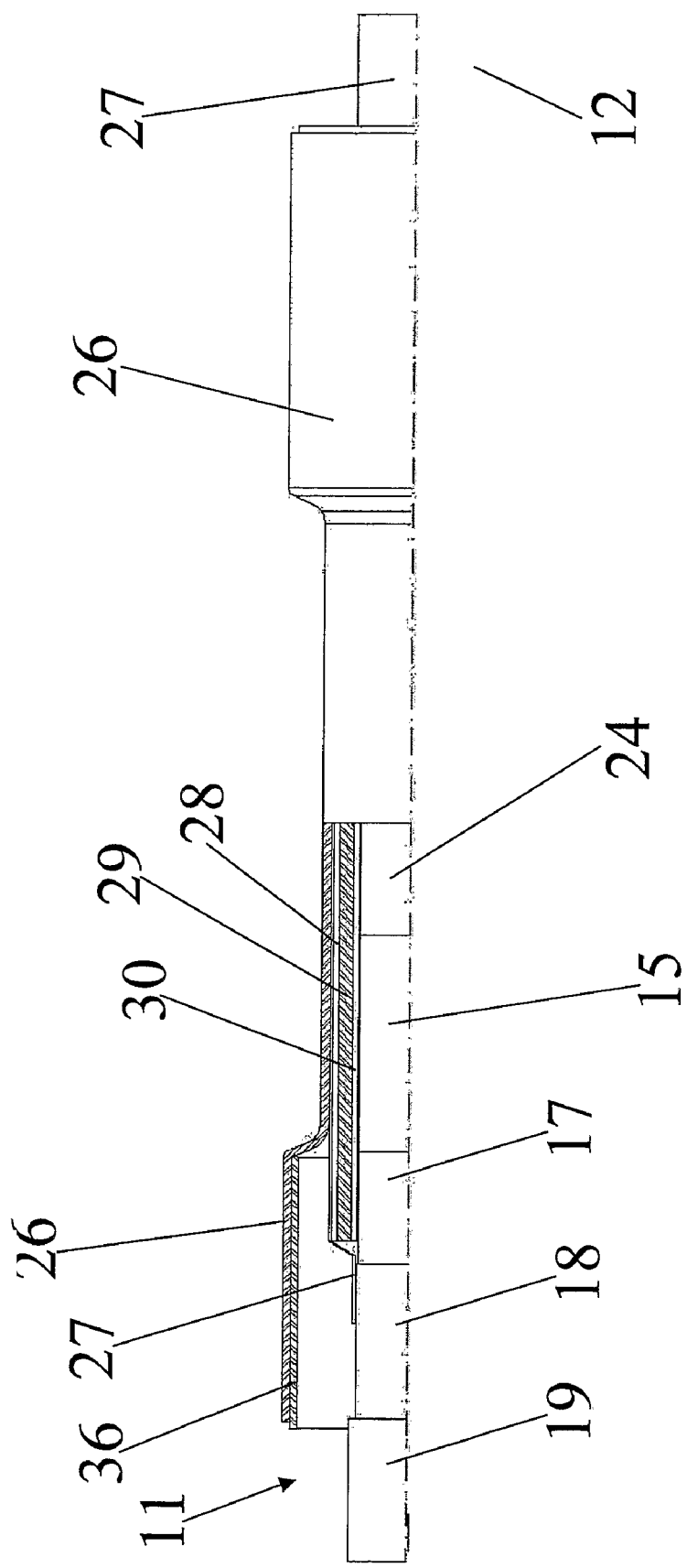
FIG. 6 shows a partially-sectioned side view of the joint assembly of FIG. 5 during the collapsing step of the tubular elastic covering element of the joint assembly.

As shown in FIG. 6, the second supporting elements 36a, 36b—which hold the forward folded portions 33 of the protective outer sheath 26—are axially moved towards the axial ends of the joint assembly 50 so as to unfold the protective outer sheath 26 for its whole length over the spliced cables.

Once the folded portions of the protective outer sheath 26 have been unfolded, the second supporting elements 36a, 36b are successively removed by pulling respectively the free end portions 37a, 37b so that the protective outer sheath 26 is caused to collapse over the cable polymeric outer sheath so as to restore it upstream and downstream the connecting zone, sealing off the latter from the surrounding environment.

Alternatively (said embodiment being not shown in the figures), the tubular elastic sleeve 25 is supported, in the expanded condition, on a first removable supporting element 31 while the protective outer sheath 26 is supported, in a radially expanded condition, on a further first removable supporting element 31 and on a second removable supporting element 36.

In details, according to said embodiment of the method of the present invention, once the electric connection of the conductors 13, 14 is performed, the tubular elastic sleeve 25 is caused to collapse on the splicing zone by removing the first supporting element 31 so that the insulating layer and the external semiconductive layer of the two cables can be restored.

Successively, the metallic screen 18 of the cables is restored, for instance by applying a metallic braid 27 on the cable length comprised between the metallic screen of cable 11 and the metallic screen of cable 12.

Finally, the protective outer sheath 26 in the expanded condition is moved (from the parking area) onto the splicing zone and is caused to collapse by removing the further first removable supporting element 31—on which the central portion of said sheath is supported in the expanded condition—and then by removing the second removable supporting elements 36 on which the forward folded portions 33—at each axial end of the protective outer sheath 26—are supported in a radially expanded condition.

It can be observed that the covering assembly of the present invention can be used for splicing cables of several sizes, thereby reducing the necessity of storing several series of tubular elastic sleeves suitable for different cable diameters.

For further description of the invention, an illustrative example is given herein below.

Example 1

Two medium voltage electric cables were spliced by using the method of the present invention.

The cable features are reported in Table 1.

TABLE 1

| Cable constitutive elements | Cable features |
|---|---|
| Conductor | cross-sectional area = 95 mm$^2$ |
| Insulating Layer | external diameter = 25.90 mm |
| Outer semiconductive Layer | external diameter = 27.90 mm |
| Metallic screen | external diameter = 31.00 mm |
| External polymeric sheath | external diameter = 37.00 mm |

A tubular elastic sleeve 25—including a semiconductive layer 28, an insulating layer 29 and a high relative dielectric constant layer 30—was supported on a first tubular supporting element 31 of the removable type.

Said first tubular supporting element 31 was made of polypropylene and was formed of two identical half-supports axially abutting each other.

A metallic braid 27 was successively provided in the splicing zone to restore the metallic screens 18 of the two cables 11, 12.

A protective outer sheath 26 was then provided supported—in an expanded condition—on a further first supporting element 31 and on two second tubular supporting elements 36a, 36b.

In details, the further first supporting element 31 and the two second supporting elements 36a, 36b were both of the removable type and made of polypropylene.

The features of the further first supporting element are reported in Table 2.

TABLE 2

| External diameter | 62 mm |
|---|---|
| Internal diameter | 56 mm |
| Whole length (sum of the lengths of the two half-supports) | 400 mm |

The features of the second supporting elements are reported in Table 3.

TABLE 3

| External diameter | 90 mm |
|---|---|
| Internal diameter | 82 mm |
| Length of each supporting element | 150 mm |

The protective outer sheath 26 was made of ethylene-propylene rubber (EPR).

The protective outer sheath 26 had a 300% modulus of about 3.5 MPa.

The protective outer sheath 26 had a permanent set of about 50%.

The interference between the tubular elastic sleeve 25 and the first supporting element 31 was of about 250%.

The interference between the protective outer sheath 26 and the second supporting elements 36a, 36b was of about 350%.

The thickness of the protective outer sheath 26 in the rest (unstretched) condition was of about 5 mm.

The resulting interference between the protective elastic outer sheath and the outer diameter of the cable outer sheath was of about 65%.

The whole length of the protective outer sheath 26—when collapsed on the splicing zone—was of about 800 mm.

Therefore, according to the method of the present invention, it can be pointed out that the axial size of the unfolded protective outer sheath was 50% greater than the axial size of the protective outer sheath in the folded condition.

This means that the method of the present invention allows to remarkably reduce the axial dimensions of the protective outer sheath, thereby reducing the axial dimensions of the parking zone which is required during installation.

The invention claimed is:

1. Method for covering an elongate object, said method comprising:
   providing a covering assembly which comprises: a tubular elastic covering element having at least one end which is folded to obtain at least one backward folded portion and at least one forward folded portion; a first supporting element which is arranged radially internal to said covering element and which holds said covering element in a radially stretched condition, and a second supporting element which is coaxially arranged around said first supporting element, said second supporting element holding said at least one forward folded portion in a radially stretched condition;
   placing said covering assembly substantially coaxially with the elongate object and radially external thereto;
   removing said first supporting element to allow the covering element to collapse onto the elongate object, and removing said second supporting element to allow the at least one backward folded portion and the at least one forward folded portion to collapse onto the elongate object.

2. Method according to claim 1, further comprising unfolding the at least one backward folded portion and the at least one forward folded portion over the elongate object.

3. Method according to claim 2, wherein unfolding is carried out by axially translating the at least one forward folded portion while being hold on the second supporting element.

4. Method according to claim 3, wherein the axial translation of the at least one forward folded portion is carried out in a direction substantially parallel to a longitudinal axis of the covering assembly.

5. Method according to claim 3, wherein the axial translation of the at least one forward folded portion is carried out towards the axial end of said at least one forward folded portion.

6. Method according to claim 2, wherein unfolding is carried out before removing said second supporting element.

7. Method according to claim 1, wherein removing the first supporting element is carried out to allow the covering element to gradually collapse onto the elongate object.

8. Method according to claim 1, wherein removing the second supporting element is carried out to allow the at least one backward folded portion and the at least one forward folded portion to gradually collapse onto the elongate object.

9. Method according to claim 1, further comprising the splicing two elongate objects.

10. Method according to claim 9, wherein the two elongate objects have a splicing zone between them and wherein placing the covering assembly consists in positioning the covering assembly in correspondence of the splicing zone of said two elongate objects.

11. Method according to claim 10, further comprising engaging the covering assembly around one end of a first elongate object of said two elongate objects.

12. Method according to claim 11, further comprising parking the covering assembly on said first elongate object.

13. Method according to claim 12, wherein parking is carried out after engaging.

14. Method according to claim 1, wherein removing the first supporting element comprises exerting a pulling force on a free end portion of said first supporting element.

15. Method according to claim 1, wherein the first supporting element comprises a first half-support and a second half-support.

16. Method according to claim 15, wherein removing the first supporting element comprises removing the first half-support and removing the second half-support.

17. Method according to claim 16, wherein removing the second half-support is carried out successively to removing the first half-support.

18. A covering assembly for covering an elongate object, said assembly comprising:
   a tubular elastic covering element having at least one end which is folded to define at least one backward folded portion and at least one forward folded portion;
   a first supporting element which is arranged radially internal to said covering element and which holds said covering element in a radially stretched condition, and a second supporting element which is coaxially arranged around said first supporting element, said second supporting element holding the at least one forward folded portion in a radially stretched condition.

19. Covering assembly according to claim 18, wherein the at least one backward folded portion and the at least one forward folded portion are coaxially arranged and radially superimposed.

20. Covering assembly according to claim 19, wherein the at least one backward folded portion and the at least one forward folded portion are radially spaced apart from each other.

21. Covering assembly according to claim 18, wherein the at least one backward folded portion and the at least one forward folded portion are consecutive.

22. Covering assembly according to claim 21, wherein the at least one backward folded portion and the at least one forward folded portion are continuously joined by means of at least a first curvilinear portion and a second curvilinear portion of said elastic tubular sleeve.

23. Covering assembly according to claim 18, wherein the covering element is made of a material having a three hundred percent modulus from 1 to 10 megapascals.

24. Covering assembly according to claim 18, wherein the elongate object has an outer diameter and an interference between the covering element and the outer diameter of the elongate object is greater than or equal to twenty percent.

25. Covering assembly according to claim 18, wherein an interference between the covering element and the first supporting element is comprised between one hundred and 50 percent and three hundred percent.

26. Covering assembly according to claim 18, wherein an interference between the at least one forward folded portion and the second supporting element is comprised between two hundred percent and four hundred percent.

27. Covering assembly according to claim 18, wherein the covering element is made of a material having a permanent set lower than seventy percent.

28. Covering assembly according to claim 18, wherein the covering element has a rest condition and the thickness of the covering element in the rest condition is comprised between two millimeters and ten millimeters.

29. Covering assembly according to claim 18, wherein the inner diameter of the covering element in the rest condition is comprised between ten millimeters and eighty millimeters.

30. Covering assembly according to claim 18, wherein the first and second supporting elements are rigid tubular elements.

31. Covering assembly according to claim 18, wherein the at least one backward folded portion and the at least one forward folded portion extend in a longitudinal direction and are substantially parallel to a longitudinal axis of the covering assembly.

32. Covering assembly according to claim 18, wherein the at least one forward folded portion and a central portion of the covering element have an expansion degree, and the expansion degree of the at least one forward folded portion is at least ten percent greater than the expansion degree of a central portion of the covering element.

33. Covering assembly according to claim 32, wherein said expansion degree is comprised between fifteen percent and sixty percent of the expansion degree of the central portion of the covering element.

34. A joint assembly for electric cables comprising:
a first supporting element;
a tubular elastic sleeve which comprises at least an electric insulating layer, said tubular elastic sleeve being supported on said first supporting element in a radially stretched condition;
a tubular elastic outer sheath having at least one end which is folded to define at least one backward folded portion and at least one forward folded portion, said tubular elastic outer sheath being placed radially external to said tubular elastic sleeve, and a second supporting element which is coaxially arranged around said first supporting element, said second supporting element holding said at least one forward folded portion in a radially stretched condition.

35. Joint assembly according to claim 34, further comprising a tubular metallic braid which is positioned around the tubular elastic sleeve.

36. Joint assembly according to claim 35, wherein the tubular metallic braid is positioned between the tubular elastic sleeve and the tubular elastic outer sheath.

37. Joint assembly according to claim 34, further comprising a semiconductive layer around said electric insulating layer.

\* \* \* \* \*